United States Patent

Demusz et al.

[11] Patent Number: 6,000,168
[45] Date of Patent: Dec. 14, 1999

[54] COMBINATION TRAP, HOLDING PEN AND CHUM POT

[75] Inventors: Donald R. Demusz, Lincoln, Del.; William J. Gifford, Egg Harbor City, N.J.

[73] Assignee: Gifford Ventures, Inc., Pleasantville, N.J.

[21] Appl. No.: 08/990,049

[22] Filed: Dec. 12, 1997

[51] Int. Cl.⁶ ............................................ A01K 69/08
[52] U.S. Cl. .......................... 43/65; 43/55; 43/56
[58] Field of Search ........................ 43/54.1, 56, 60, 43/64, 65, 66, 100, 102, 103, 105, 55, 58, 67; 206/315.11; 220/560, 601, 661

[56] References Cited

U.S. PATENT DOCUMENTS

| | | |
|---|---|---|
| 995,203 | 6/1911 | Thomas et al. ..................... 220/253 |
| 1,162,791 | 12/1915 | Lubas . |
| 1,607,443 | 11/1926 | Cormier . |
| 2,111,959 | 3/1938 | Baxter . |
| 2,734,306 | 2/1956 | Holdeman . |
| 2,912,785 | 11/1959 | Nudell ........................................ 43/56 |
| 3,191,338 | 6/1965 | Burgess et al. ......................... 43/102 |
| 3,337,982 | 8/1967 | Sajulan ........................................ 43/65 |
| 3,800,464 | 4/1974 | Parker ........................................ 43/100 |
| 4,221,071 | 9/1980 | Sjolund .................................... 43/100 |
| 4,237,645 | 12/1980 | Kinser ...................................... 43/102 |
| 4,509,288 | 4/1985 | Shepherd ................................. 43/102 |
| 4,554,760 | 11/1985 | Ponzo ....................................... 43/105 |
| 4,611,424 | 9/1986 | Tarantino ................................. 43/100 |
| 4,654,997 | 4/1987 | Ponzo ....................................... 43/102 |
| 4,739,579 | 4/1988 | Jakimas .................................... 43/102 |
| 4,897,953 | 2/1990 | Bruce ....................................... 43/102 |
| 5,168,653 | 12/1992 | Wyman et al. .......................... 43/100 |
| 5,287,647 | 2/1994 | Longo ...................................... 43/105 |
| 5,353,541 | 10/1994 | Jonason et al. ......................... 43/105 |
| 5,357,708 | 10/1994 | Peters et al. ............................ 43/100 |
| 5,478,273 | 12/1995 | Ives ........................................... 452/1 |
| 5,529,204 | 6/1996 | Sykes ..................................... 220/335 |

*Primary Examiner*—Jack W. Lavinder
*Attorney, Agent, or Firm*—Jacobson, Price, Holman & Stern, PLLC

[57] ABSTRACT

A multipurpose marine life container having a closed chamber defined by a pair of substantially identical clam shell-type housing halves opening toward each other and removably joined together along a parting line. An entrance opening is formed in each end wall of the container by a pair of half openings opening toward each other along the parting line. Each end wall supports a rotatable disk that includes three inwardly opening entry funnel areas as well as a closed area rotatable into and out of registry with the corresponding entrance opening. Hollow tubes with air tight closures are removably secured lengthwise through the container to provide buoyancy, weighting and reinforcement for the container. The opposite sides of the container include large openings which are selectively closed by cantilever supported doors swingable by gravity to the open positions and releasably latchable in the closed positions. A lifting bridle for the container can be attached to the free swinging edges of the doors whereby the doors may be closed by a lifting line. The opposite side doors are each pivotally mounted from the hollow tubes.

16 Claims, 7 Drawing Sheets

COMBINATION TRAP, HOLDING PEN AND CHUM POT

BACKGROUND OF THE INVENTION

1. Field of the Invention

This invention relates to a multipurpose marine life container or cage which has holes, slots or other perforations for the passage of water and air therethrough and which may be used as a holding pen for bait fish or other marine life, as a chum pot, as a self-tending bait pot or trap and as a manually tending bait pot or trap. The multipurpose marine life container may be variously formed but is preferably formed out of molded plastic or the like and incorporates two substantially identical clam shell-like halves joined together along a parting line or plane.

2. Description of Related Art

Watermen, fishermen, crabbers and other persons experiencing recreation near or on bodies of water containing various forms of marine life often have use for a marine life holding pen, a chum pot, a self-tending bait or crab pot or a tending bait or crab pot, and each of these structures usually has a significantly different construction and requires various types of maintenance. Prior U.S. patents disclose various different forms of marine life traps or pots. For example, Nudell U.S. Pat. No. 2,912,785 discloses a combined minnow bucket and minnow trap including major side wall portions constructed of wire mesh and including opposite end entrance openings for minnows, the openings having swingable closure disks operatively associated therewith. Parker U.S. Pat. No. 3,800,464 discloses a fish trap constructed from plastic mesh combined with a wire frame and includes a removable entrance cone or funnel pivotally mounted on the frame and held in place by spring loaded hooks connected to the frame. The patent to Sjolund, U.S. Pat. No. 4,221,071, discloses a crab trap incorporating different size mesh panels to allow the escape of smaller species of crabs through the larger mesh panels.

Tarantino U.S. Pat. No. 4,611,424 discloses a selectable entry shell fish trap incorporating a joinable two-section molded plastic cage-like enclosure provided with remote side inwardly opening funnel portions for the entrance of shell fish into the trap. The patent to Wyman et al., U.S. Pat. No. 5,168,653, discloses an entrance gate apparatus for a crab trap or pot including structure for selectably adjusting the effective size of the opening defined by the entrance gate. U.S. Pat. No. 5,353,541 to Jonason et al. discloses a collapsible tending crab trap having a central located bait feeder made of wire mesh material.

Peters et al. U.S. Pat. No. 5,357,708 discloses an aquatic trap including a wall portion thereof defining an inwardly opening funnel area with the wall portion pivotally mounted from the remainder of the trap. U.S. Pat. No. 5,478,273 to Ives discloses a crab pot having inwardly opening funnel-like entrance areas provided with pivoted closure members, gravity biased to the closed positions, and which may be pushed toward the open positions from the closed positions by crabs attempting to enter the pot.

Thus, the prior art discloses traps, holding pens and chum pots in one or two forms, but not in all three forms combined. In the prior art, traps are also known to have funnels for the entry of the marine life to be trapped, but not as an adjustable part of the trap. The prior art also discloses traps which can be self-tending (with funnels) or manual tending, with collapsible doors, but not combined in one apparatus or container. Traps are also known in the prior art to have ballast weights or floats, but not ballast tubes configured to fit neatly within the confines of the trap structure itself. Further, the prior art does not disclose an apparatus that allows all of the functions to be performed within one unit, as accomplished by the present invention, especially by simply adjusting the attached parts of the apparatus, and in an apparatus which can be easily assembled and disassembled for cleaning and storage. Finally, the prior art fails to disclose the utilization of biodegradable plastic hooks associated with collapsible doors for environmental purposes or a removable bait basket that fits neatly into the top hatch of the apparatus structure.

SUMMARY OF THE INVENTION

In accordance with the foregoing, the marine life container or cage of the present invention includes appropriate structure so that the container can perform many functions in one apparatus by utilizing adjustable parts. Hence, by simply adjusting the component parts, the marine life container or cage can be easily transformed from a combination trap to a holding pen to a chum pot.

More specifically, the marine container or cage of the present invention includes a top wall, a bottom wall of generally the same size as the top wall and parallel thereto, a pair of opposed end walls having substantially the same size and shape, and a pair of side walls, also of generally the same size and shape. The side walls have a upper section and a lower section such that the top wall, bottom wall and side walls define a generally hexagonal shape for the container when looking at an end.

The container includes at least one shiftable gate member to change or close the entrance opening into the container. As disclosed, the shiftable gate member is a rotary structure assembled into the container end wall, and the entrance opening is formed in the end wall. Preferably the rotary structure and entrance opening are included at both end walls. The rotary gate member has a series of inwardly opening entry funnels or funnel structures which can be aligned with the entrance opening in the end wall by rotation of the rotary structure. In addition, the rotary funnel structure preferably has a solid blank area that also can be positioned to close off the trap entrance opening. The several inwardly opening entry funnels have different sizes so that, when rotated into position with the end wall opening, the container or cage of the present invention may be effectively used as a trap for different sizes and types of marine life.

The marine life container of the present invention also has cantilevered side panel doors, preferably on both opposite sides of the container, which close off large openings in the side walls of the container. These doors are pivotally mounted on the container and are designed to open automatically to an outward and downward open position unless latched in the closed position by a hook or the like or held in a closed position by a suitable bridle attached to the free ends of the doors. In this mode, the container or cage of this invention can be used as a crab trap or pot, if desired, and the rotary funnel structure is preferably rotated to close off the entrance openings in the end walls.

Hollow, elongated ballast tubes extend between the container end walls and serve both to adjust the buoyancy of the container and provide strength and torsional reinforcement to the container structure. The tubes are preferably in pairs, upper and lower, extending through aligned openings in the upper and lower corners of the end walls and are capped off with caps or the like which can engage the outside surface of the end walls. In this arrangement, the ballast tubes are positioned inside the enclosed chamber of the container, but can be filled through ends extending out of the end walls.

A removable bait basket is designed to sit under the top hatch lid, or can be removed when the trap is used as a holding pen or chum pot. The bait basket is preferably designed so that it can be used independently as a small chum or bait basket, once removed from the trap if desired. A bridle controls the opening of the side panel doors as well as the stability of the trap as it hangs on the line fastened to a bridle ring or the like.

All of the component parts of the container or cage of the present invention are preferably molded from any suitable plastic material or materials such as polypropylene, polyethylene, PVC, etc. for ease of manufacture, assembly and disassembly, parts interchangability, and cleaning, as well as cost economy and durability. Further, the frame of the multipurpose marine life container of the instant invention, in its most desirable form, is molded in the form of substantially identical halves to maintain the costs thereof at a minimum.

It is therefore an object of this invention to provide a multipurpose marine life container which may be used for multiple purposes in conjunction with multiple forms of marine life.

Another object of this invention is to provide a marine life container which may be inexpensively produced of molded plastic components and incorporating two major identically formed frame components.

A further object of this invention is to provide a multipurpose marine life container including at least one shiftable gate member having different sized funnels and solid blank area which cooperates with the entrance opening into the container in such a manner such that the entrance opening can be fitted with different sized entry funnels or readily closed.

Still a further object of this invention is to provide a marine life container or trap having cantilevered side panel doors which close off large openings in the side walls of the container which cooperate with a suitable bridle to open and close the side panel doors over the side wall openings.

Still another object of this invention is to provide a multipurpose marine life container which may be utilized both as a holding pen for marine life, as a chum pot for cut, ground or other type bait, as a self-tending bait or crab pot or as a tending bait or crab pot or as a trap for other marine creatures.

A yet further object of this invention is to provide a multipurpose marine life container or cage whose buoyancy may be adjusted as desired by elongated ballast tube components fitted into the container frame so as to enhance the strength of the container.

Yet still another object of this invention is to provide a multipurpose marine life container having gravity openable doors which can be closed by a biodegradable latch or catch thereby enabling marine life trapped within a "lost" container to escape therefrom after a predetermined time interval.

A final object of this invention to be specifically enumerated herein is to provide a multipurpose marine life container in accordance with the preceding objects which will conform to conventional forms of manufacture, be of simple construction and easy to use, economically feasible, long lasting and relatively trouble free in operation.

These together with other objects and advantages which will become subsequentially apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Although only one preferred embodiment of the invention is explained in detail, it is to be understood that the invention is not limited in its scope to the details of construction and the arrangement of components set forth in the following description or illustrated in the drawings. The invention is capable of other embodiments and of being practical or carried out in various ways. Also, in describing the preferred embodiment, specific terminology will be resorted to for the sake of clarity. It is to be understood that each specific term includes all technical equivalents which operate in a similar manner to accomplish a similar purpose.

Referring now more specifically to the drawings, the numeral 10 generally designates the preferred embodiment for the multipurpose marine life container or cage of the instant invention. The container 10 preferably includes identical one-half clam shell-type housing or frame halves 12 and 14. The housing or frame halves 12 and 14 are removably joined together along a generally central parting line or plane coinciding with the plane designated by the section line 3—3 of FIG. 2. Each housing or frame half 12, 14 includes a pair of partial end walls 16 and 18, partial top and bottom walls 20 and 22 and a side wall 24. The side walls 24 extend between and interconnect the partial end walls 16 and 18 and partial top and bottom walls 20 and 22 of each housing half 12, 14. The pair of partial end walls 16, 18 form opposed and generally parallel end walls of approximate equal size. The end walls are generally designated by the numerals 13 and 15. The partial top and bottom walls 20 and 22 form generally parallel and same size top and bottom walls, generally designated by the numerals 21 and 23, respectively. The side walls 24 preferably have upper and lower portions causing the container to have a generally hexagonal cross-section shape, see FIG. 4.

Figure 3:
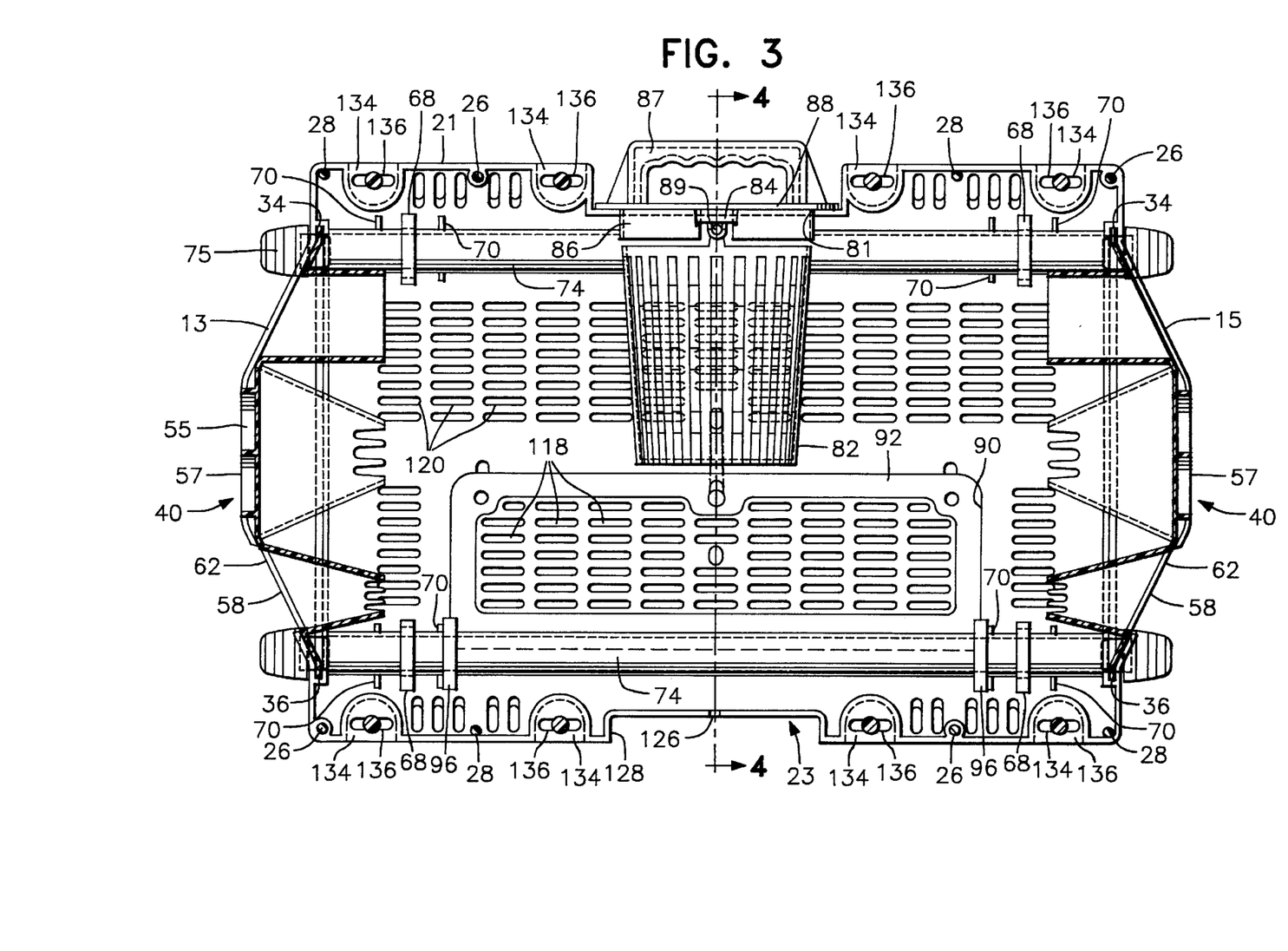
FIG. 3 is a vertical sectional view of the container taken substantially upon the section line 3—3 of FIG. 2 with the bait container and top hatch lid illustrated in elevation.

As may best be seen from FIG. 3, the housing halves 12 and 14 include outwardly opening recesses 26 and outwardly projecting pins 28. When the housing halves 12 and 14 are properly mated and joined together, the pins 28 are snugly received in the recesses 26 and may be fixedly secured therein by any suitable glue or adhesive, although an alternate preferred method of securing the halves 12 and 14 together is described hereinafter.

Each pair of partial end walls 16 and 18 have opposing coextensive center one-half circular openings 30 formed therein. The openings 30 are semicircular in shape and thereby define, together, a circular generally central opening 32 in the end walls 13, 15, see FIG. 2. In addition, each pair of partial end walls 16 and 18 includes a semicircular inwardly opening channel 34, see FIG. 3. Thus when housing halves 12, 14 are joined, the channels 34 at each end of the container 10 together define an inwardly facing substantially circular channel 36 on the inside of the end walls 13 and 15 defined by the partial end walls 16 and 18.

Figure 5:
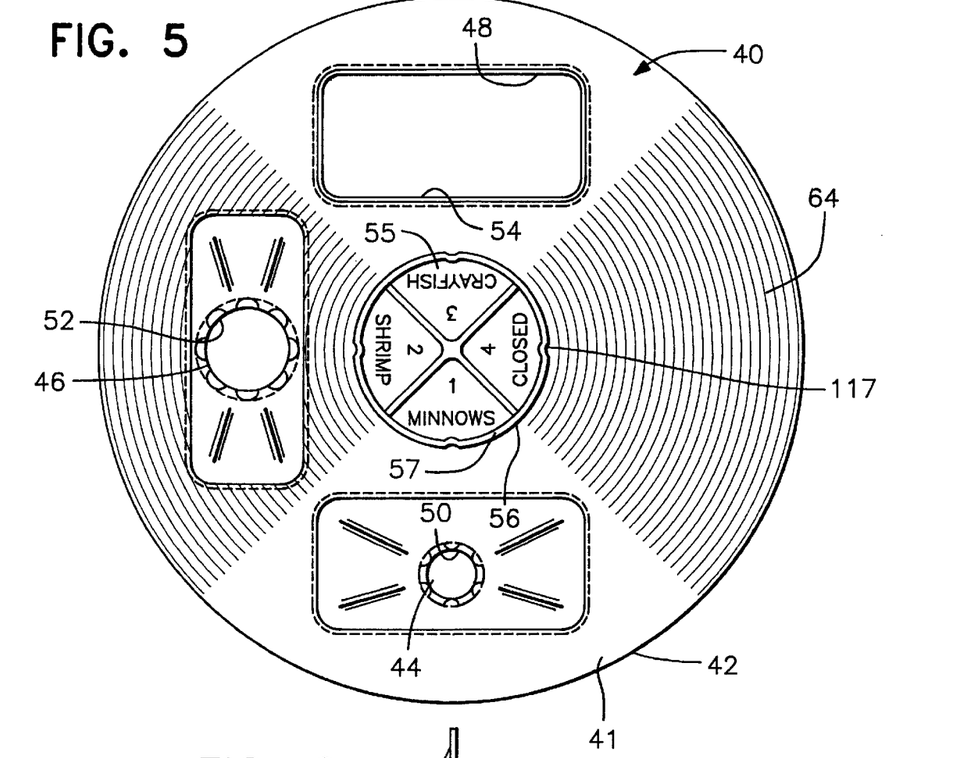
FIG. 5 is an enlarged elevational view of one of the rotary gate members preferably provided at each end of the multipurpose container in accordance with the present invention.
Figure 6:
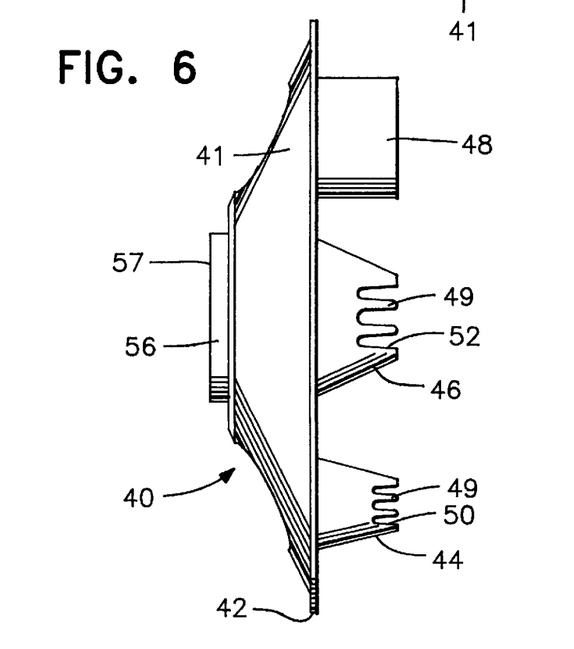
FIG. 6 is a reduced side elevational view of the gate member illustrated in FIG. 5 and as seen from the right side of FIG. 5.

The shiftable gate member in the preferred embodiment is a circular gate member generally designated by the numeral 40, see FIGS. 3, 5 and 6, and is preferably provided at each end of the container 10. The gate member 40 includes a substantially circular disk 41 with an outer periphery 42 which is held captive within the circular channel or groove 36 defined in the end walls 13 and 15 of the container 10. Each gate member 40 is thereby rotatably mounted at each end of the container 10 on the inside of the corresponding end walls 13 and 15. As shown in FIG. 3, the central portion 38 of end walls 13 and 15 and gate members 40 have preferably a slight outward frusto-conical shape, rather than flat.

Each gate member 40 preferably includes three inwardly opening entry funnel structures or areas 44, 46 and 48 opening inwardly therethrough, the entry funnel 44 defining a small opening 50, the entry funnel 46 defining a medium size opening 52 and the entry funnel 48 defining a large opening 54. In addition, the central area of each gate member 40 includes a circular projection 56 which is rotatably received within the center opening 32 defined in the center of each end wall portion 38. The projection 56 is designed to have finger slots 55 in its outer face 57 while the edges are substantially flush with the adjacent outer surfaces of the corresponding central end wall portion 38.

Figure 1:
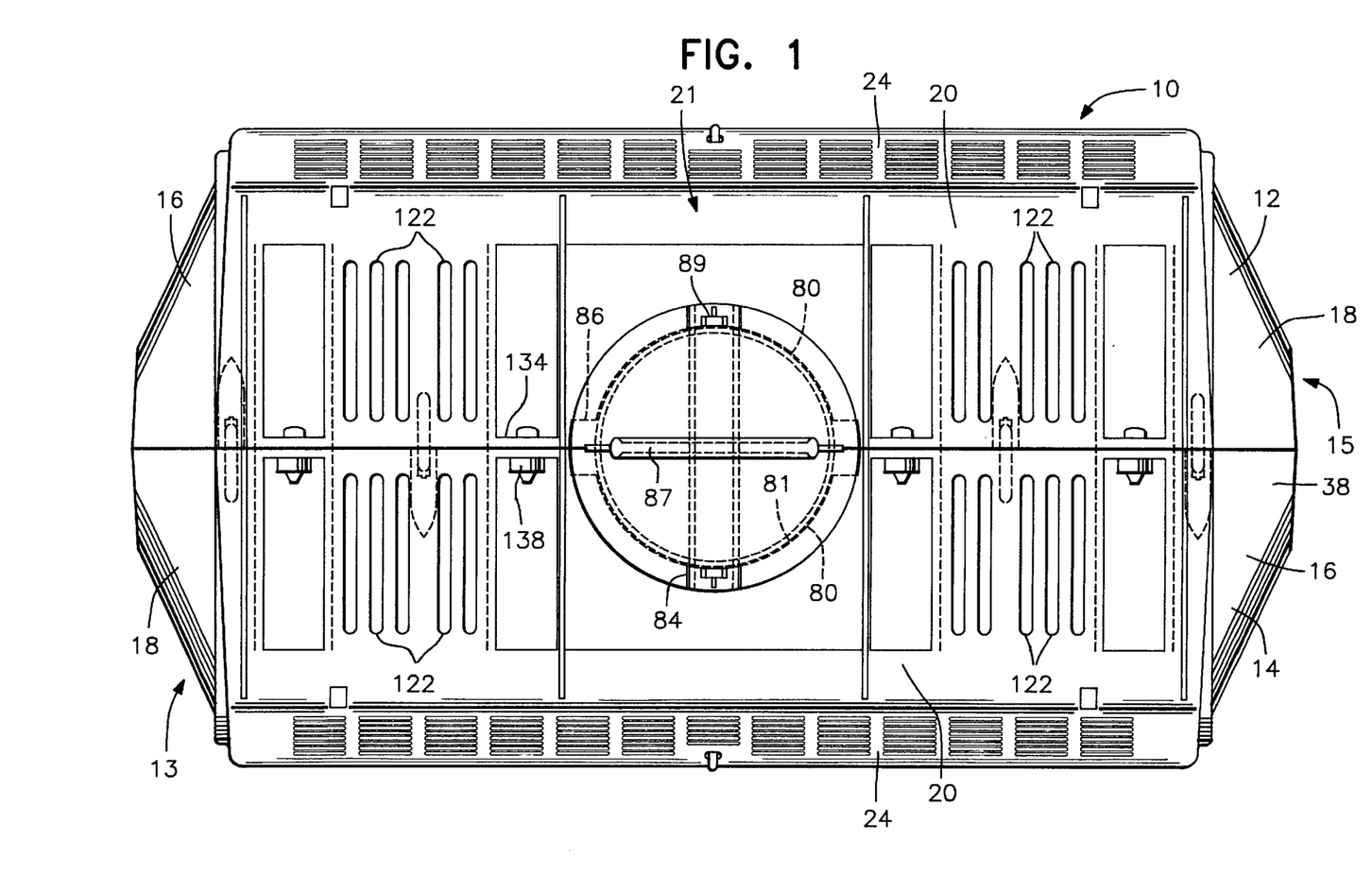
FIG. 1 is a top plan view of the preferred embodiment of the multipurpose marine life container of the instant invention.
Figure 2:
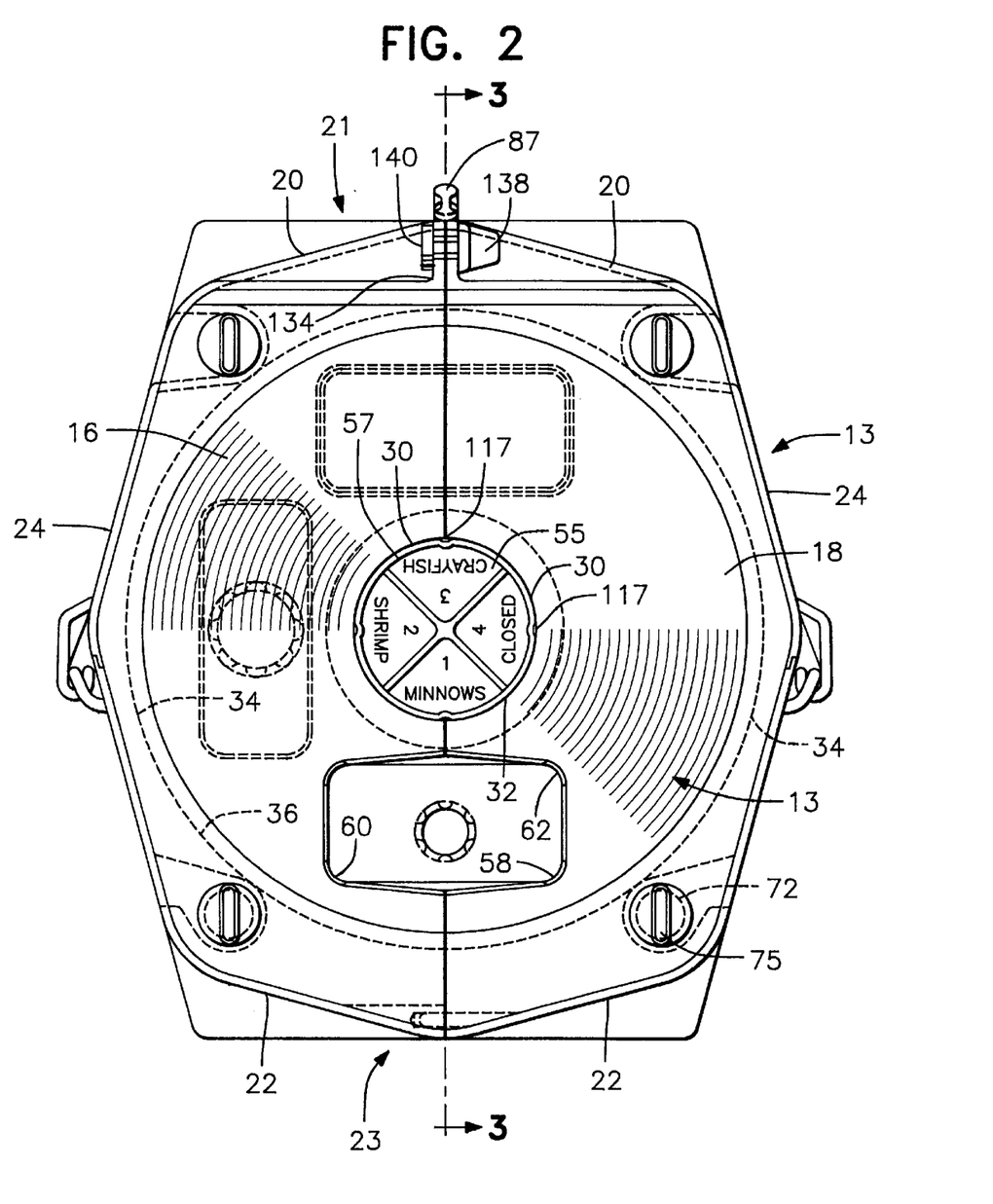
FIG. 2 is an end elevational view of the multipurpose container of the present invention as seen from the lower end of the container illustrated in FIG. 1.

As may best be seen from FIGS. 2 and 3, each pair of partial end walls 16 and 18 also includes coextensive openings 58 and 60 formed therein which open toward each other and define an entrance opening 62 through the corresponding end wall portion 38. Each entrance opening 62 is spaced radially outwardly from the center of the central opening 32 and each set of corresponding funnels 44, 46 and 48 are spaced approximately the same distance from the center of rotating gate member 40 so that each entry funnel may be swung into registry with the entrance opening 62. Each gate member 40 also includes a solid area 64 which is capable of swinging into registry with the corresponding entrance opening 62 to close the opening when desired. Thus, each entrance opening 62 may be either closed by the corresponding closing area 64 or selectively open by one of the funnels 44, 46 and 48 registered therewith. In the preferred embodiment, the gate member 40 with funnels 44, 46 and 48 and projection 56 are molded as a one-piece integral construction with disk 41.

The opposite ends of each side wall 24 preferably include upper and lower inwardly offset sleeve portions 68 with the upper and lower pairs of sleeve portions 68 axially aligned. In addition, each side wall 24 preferably includes a pair of inwardly opening semicircular abutment fins or members 70 disposed on opposite sides of and registered with each sleeve portion 68. Further, each partial end wall 16 and 18 includes a recessed flat area 71 near the corner of the end walls 13 and 15 which has an opening 72 therethrough, registered with the corresponding sleeve portions 68 and fins 70.

Figure 7:
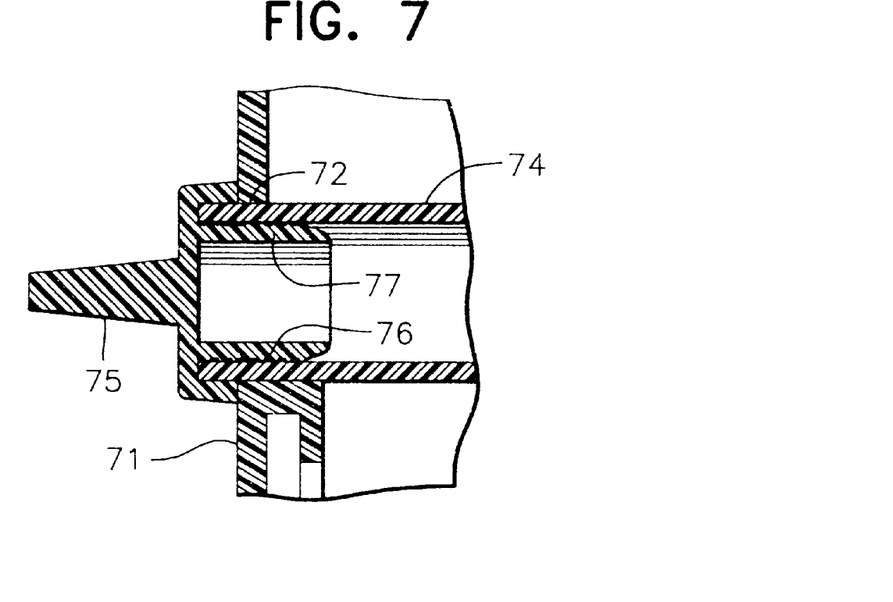
FIG. 7 is an enlarged fragmentary vertical sectional view illustrating the manner in which the buoyancy and strengthening tubes of the present invention are secured through each partial end wall of the container frame.

A pair of upper and lower elongated tubes 74 made of PVC piping or the like are passed through the corresponding openings 72 and supporting sleeve portions 68. In addition, the tubes 74 are engaged by the fins or members 70. The tubes are designed to have a length so that their ends project slightly outwardly of the recessed flat areas 71 at the corners of end walls 13 and 15. Molded caps 75 are telescoped over and into the opposite ends of the tubes 74 and can engage the outer surface of the recessed flat area 71 adjacent the openings 72 in order to keep the tubes 74 in position through the openings 72. The caps 75 are preferably ribbed as at 76 for fluid tight gripping with the inner surfaces of the tubes 74, see FIG. 7. Alternatively, the ends of tubes 74 could have female threads which mate with male threads on the male portion 77 on male caps 75. A suitable O-ring seal can also be utilized between the male member of cap 75 and the female end of tubes 74 to assure the necessary fluid seal.

The tubes 74 comprise ballast-buoyancy tubes and the upper tubes may contain air so as to increase the buoyancy of the upper portion of the container 10 and suitable weight means (not shown) may be removably contained within the lower tubes 74 to provide the necessary weighting, if desired. If the weighting provided in the lower tubes 74 is minimal, the material of container 10 is preferably selected so that the container will float. If, however, the interior of the lower tubes 74 is weighted, the container 10 will sink to the bottom of the body of water in which it is disposed. Also, it may be possible to weight the tubes 74 so that the container 10 will tend to position itself at a desired water depth, especially when positioned with bridle 97.

The partial upper walls 20 of the container 10 include opposing and coextensive semicircular openings 80 formed therein which form a top hatch opening 81 when housing halves 12 and 14 are assembled. A foraminated, cup-shaped bait basket or container 82 is downwardly insertable through the top hatch opening 81 with the basket 82 and portions of the partial top walls 20 disposed about the partial openings 80 defining coacting cam lock structure 84, 86 for supporting and removably locking the bait basket 82 within the opening 81 in the top wall 21 of the container 10. The basket or container 82 includes a removable top closure 88 from which the upper end of the basket 82 is removably attached. More specifically, the top portion of the container or basket 82 is deformable so that it can be removably attached to the top closure 88 by lug and flange assemblies 89. As shown in the drawings, see FIGS. 3 and 4, it is the closure 88 which preferably coacts with the portions of the partial top walls 20 disposed about the partial openings 80 to define the cam lock structure 84, 86. The closure 88 is provided with a suitable handle 87. Hence, when the closure 88 is in the engaged position in top hatch opening 81, the handle 87 serves as a convenient handle for the container 10. When removed from the top hatch opening 81, the basket 82 with removable top 88 can serve independently as its own small chum or bait basket.

Figure 4:
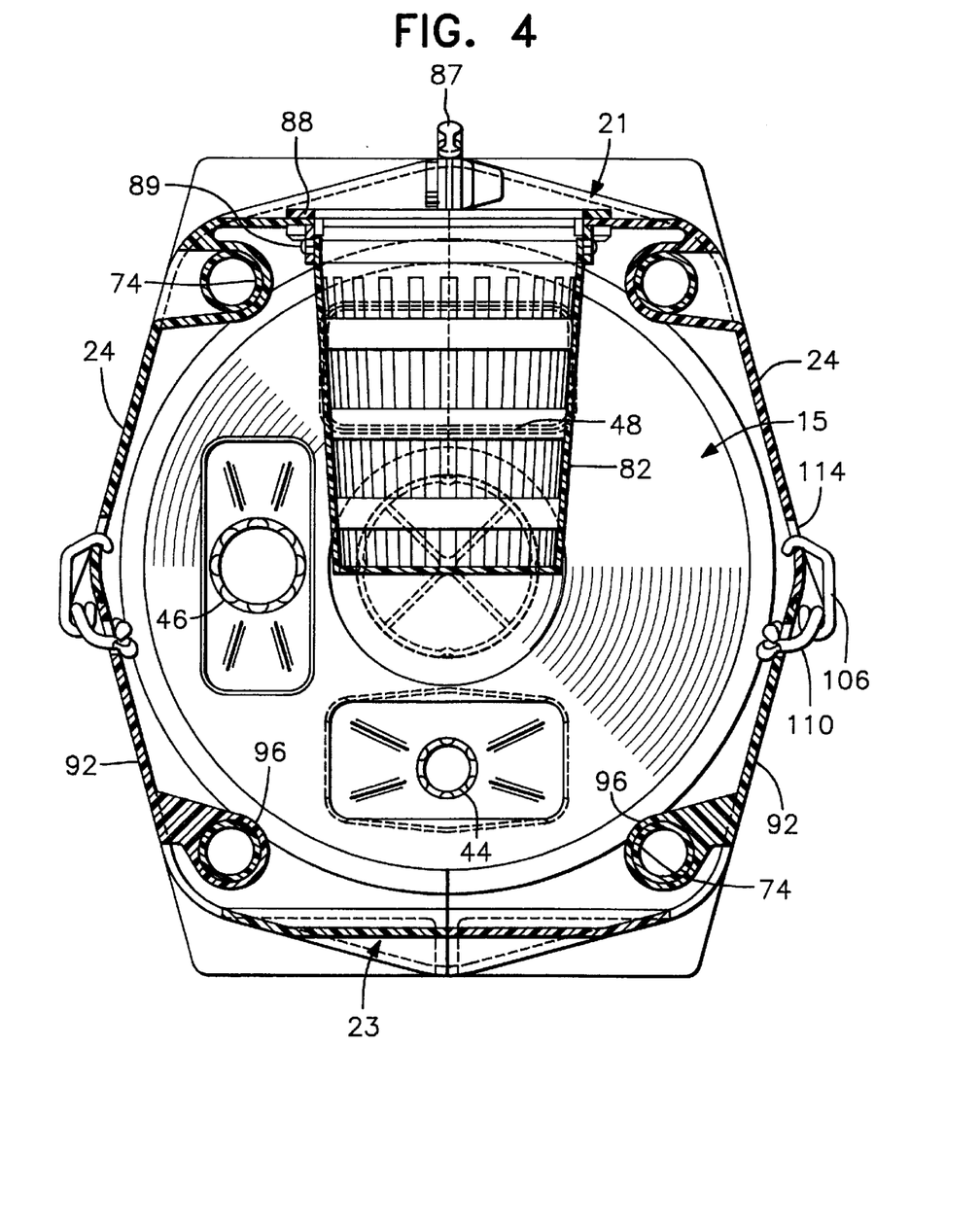
FIG. 4 is a vertical sectional view of the multipurpose container taken substantially upon a plane indicated by the section line 4—4 of FIG. 3 and illustrating the bait container and top hatch lid in section.
Figure 9:
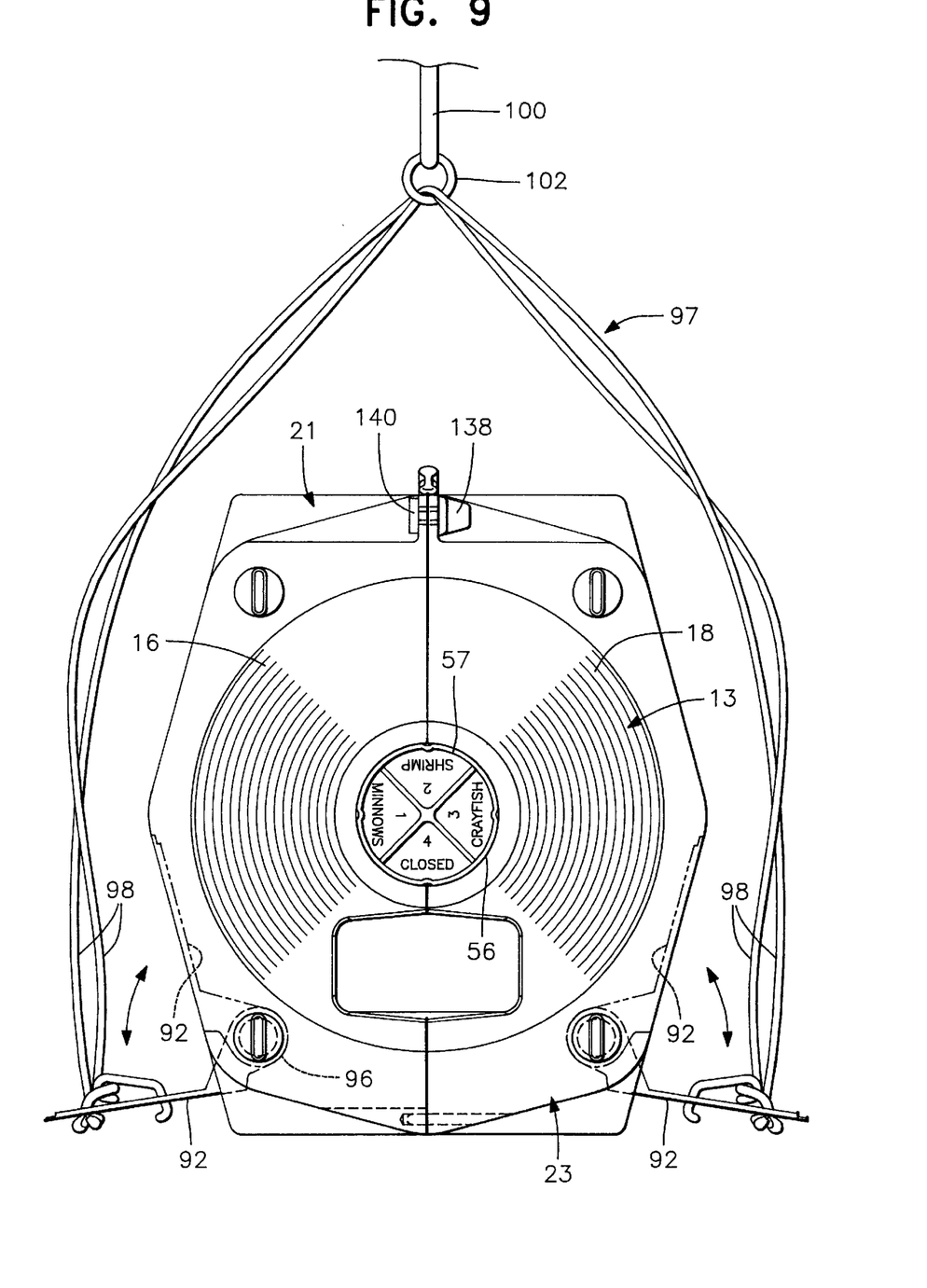
FIG. 9 is an end elevational view of the multipurpose marine life container of the present invention with the gravity openable side doors thereof in an open position rendering the multipurpose container as a tendable crab pot.

The side walls 24 have openings 90 formed therein, preferably along the lower half, as illustrated in FIGS. 3, 4 and 9, and each opening 90 has a pivoted door or closure 92 operatively associated therewith. The opposite ends of each of the doors or closures 92 include inwardly offset sleeve portions 96 which are rotatably mounted loosely around a lower tube 74. Thus, each door or closure 92 is pivotally supported from the container 10 for swinging between the open positions illustrated in solid lines in FIG. 9 and the closed positions illustrated in phantom lines in FIG. 9.

It will also be appreciated from FIG. 9 that the doors or closures 92 are supported in a cantilever fashion from the corresponding tubes 74 by reason of the preferred clam shell-type shape of the housing halves 12 and 14, the resultant hexagonal-like shape of the cross-section of the container 10, and the preferred positioning of the doors or closures 92 in the lower half of side walls 24. As such, the doors or closures 92 will swing by gravity from the closed position illustrated in phantom lines in FIG. 9 to the open position illustrated in solid lines in FIG. 9 unless restrained in the closed position.

The components of container 10 are preferably made from polypropylene, polyethylene or other suitable plastic material. A single plastic material is preferred for most of the components for ease and cost of manufacture, and polypropylene is preferred for the housing halves 12 and 14, the gate members 40, doors 92 and bait basket 82. PVC tubing is preferred for tubes 74 for cost and strength, and low density polyethylene is preferred for caps 75 for sealing efficacy.

The upper free swinging end corners of each of the doors or closures 92 has an opening or other attachment means for anchoring one end of a line portion 98 of a suitable bridle 97, and the line portions 98 extend upward to and are supported from a lift ring or other connection 102. The lift ring 102 has the lower end of a lifting line 100 anchored thereto. Thus, when the bridle 97 with line portions 98 is slack, the gates or closures 92 swing outwardly by gravity in a downward direction to the open positions illustrated in solid lines in FIG. 9. However, when the lift line 100 is lifted, thus raising bridle 97, the line portions 98 will be tensioned and pulled upward to close the doors or closures 92 and to thereafter lift the entire container 10 from the bottom surface or other location where it previously rested.

When the bait basket 82 has bait therein and the container 10 is resting on the bottom of a body of water with the doors or closures 92 in the open positions, marine life, such as crabs, may enter the container 10 through the openings 90. Then, when the lift line 100 is quickly lifted, the doors or closures 92 are rapidly swung to the closed positions and the container 10 may be lifted to the surface of the body of water in which it is disposed. In this mode of operation, the container 10 is considered a tending pot.

Figure 8:
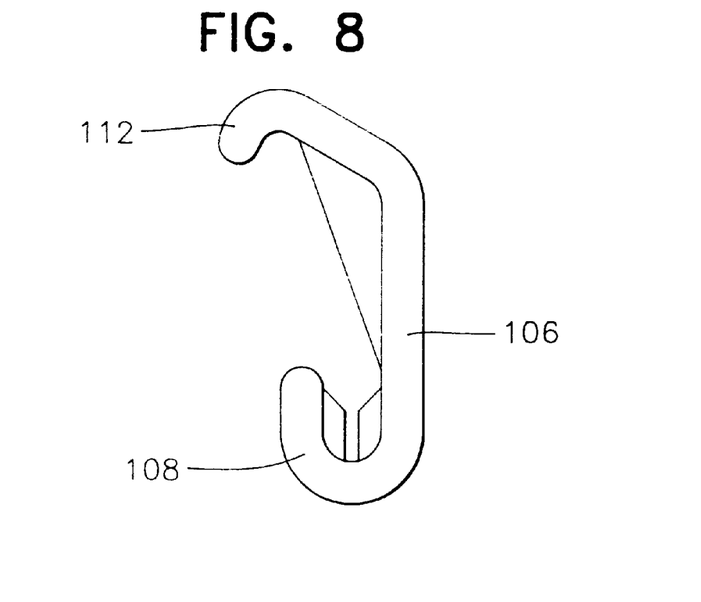
FIG. 8 is an enlarged elevational view of one of the biodegradable hook latches for the side gravity openable doors of the multipurpose marine life container of the present invention.

When utilized as a self-tending pot, any of the areas 44, 46 and 48 may be registered with each of the openings 62 and the doors or closures 92 are latched in the closed positions by a suitable hook or latch mechanism. In one embodiment, a biodegradable hook 106 (see FIG. 8) may be used when desired. Hook 106 has one end 108 thereof engaged with a short elastic cord 110 carried by the central portion of the associated door or closure 92 such as shown in FIG. 4. The other end 112 of hook 106 is removably engaged in an opening 114 formed in the corresponding side wall 24 immediately above the opening 90 therein. In this manner, the doors or closures 92 may be positively latched in the closed positions. When the container 10 is used as a tending pot with bridle 97, a hook 106 is preferably stored in an out of the way condition in a suitable hole or opening formed in the door or closure 92 (not shown).

If the container 10 is to be utilized as a self-tending pot for trapping small marine life, such as minnows, the doors or closures 92 are maintained in the closed position thereof in the manner illustrated in FIG. 4 and the small funnel 44 is registered with the entrance opening 62 at each end of the container 10 by rotating the projection 56 and gate member 40 to the desired position. On the other hand, if medium size marine life such as shrimp is to be trapped, the medium size funnel 46 is registered with the opening 62 at each end of the container 10. And, if larger marine life such as crawfish is to be trapped, the larger funnel 48 is registered with the entrance opening 62 by rotating the gate member 40 to the position where with the funnel 48 is registered with the openings 62. The inner edge of the funnels 44, 46 and 48 can preferably have flap forming teeth 49 which facilitate entry of the marine life into the enclosed chamber of the container 10, but make it difficult for the marine life to escape out of the chamber through the funnel. The slots 55 on outer face 57 of projection 56 preferably have indicia imprinted or otherwise appearing thereon to indicate the type of marine life intended to be trapped with the various sized funnels. The side wall of the projection 56 can have indentations 117 thereon which mate with projections on opening 32, thus indicating when the gate member 40 is in a selected position with the corresponding funnel or solid blank area registered with the end wall opening 62.

The doors or closures 92 each are provided with a plurality of slot openings 118 therethrough and the side walls 24 are also provided with a plurality of slot openings 120, see FIG. 3. Further, the top wall portions 20 are preferably provided with slot openings 122. Thus, the container 10 may be termed as foraminated, or having holes, slots or other perforations, to allow the free flow of water therethrough. The bait basket 82 also has slots, holes or perforations and is thus also foraminated.

The bottom wall portions 22 each include a small semicircular opening 126, see FIG. 3, and the semicircular openings 126 together define a small circular opening, when the halves 12 and 14 are secured together. This opening allows a weight body (not shown) to be secured in the downwardly opening recess 128 of bottom wall 23 defined by the abutting central edges of the partial bottom walls 22, if desired. In addition, the same opening may be utilized to secure a different form of foraminated bait basket or container (not shown) within the interior of the container 10, if desired.

The tubes 74 not only function as buoyancy and weight tubes as well as pivot points for the inwardly offset sleeve portions 96 carried by the doors or closures 92, but also as strengthening or torsional stiffening members for the container 10. Inasmuch as the tubes 74 pass through the sleeve portions 68 and are closely embraced by the fins or members 70 and also have their ends pass through the openings 72 at opposite ends of the container 10, the tubes 74 afford additional reinforcement and rigidity to the container 10.

If it is not desired to glue the projecting pins 28 in the mating recesses 26 in order to fixedly assemble the housing or frame halves 12 and 14 together, an alternate structure is provided to detachably assemble the housing halves 12 and 14. Each upper and lower margin of the housing halves 12 and 14 includes vertical flange portions 134 provided with horizontal slots 136, see FIG. 3. corresponding upper and lower slots of the housing halves 12 and 14 are registered with each other and twist shank-type fasteners 138 provided with diametric heads 140 may be utilized to removably secure the housing halves 12 and 14 together. The shank of the diametric head portions of the fasteners 138 are inserted through the corresponding registered slots 136, and the fasteners 138 then are twisted or rotated to positions with the diametric heads 140 disposed normal to the slots 136. Frictional engagement between the fasteners 138 and the flange portions 134 is sufficient to maintain the fasteners 138 in the locked positions.

As evident from the foregoing, the container or cage 10 can be readily disassembled if the pins 28 have not been fixedly secured within the recesses 26 and, instead, the housing halves 12 and 14 are held together by the fasteners 138. The closure 88 together with bait basket 82 are both readily removed from the container 10 through the top hatch opening 81 at any time. The fasteners 138 can be removed from the slots 136 and housing halves 12 and 14 thus separated from each other. This separation of the housing halves 12 and 14 allows the circular disk 41 of the gate member 40 to be released from the substantially circular channel 36, thereby separating the gate member 40 from the partial end walls 16 and 18. Removing one of the end caps 75 from each elongated tube 74 allows the tubes 74 to be removed from the housing halves 12 and 14. At the same time, removal of the lower pair of tubes 74 releases the offset sleeve portions 96 from the tubes 74. As such, the doors 92 can be readily separated from each housing half 12 and 14. Once disassembled, all of the separate components, i.e. the housing halves 12 and 14, the gate members 40, tubes 74 and doors 90, as well as the separately removable handle 88 and bait basket 82 together with fasteners 138, can all be individually cleaned. The components can then be reassembled by reversing the order of disassembly described above for reuse of the container. Also, new parts can be substituted for worn out or damaged parts.

The foregoing is considered as illustrative only of the principles of the invention. Further, numerous modifications and changes will readily occur to those skilled in the art. For example, instead of the rotatable gate 40 as disclosed for the preferred embodiment, a shiftable gate could be a two directional sliding gate that slides within guides on a generally planar end wall or side wall, either sliding horizontally or vertically, or even diagonally. In this configuration, the different size funnels 44, 46 and 48 and closing area 64 of the sliding gate should be unidirectionally aligned with the entrance opening 62 so that each could be properly registered, as desired. Similarly, the buoyancy and reinforcing tubes 74 need not be perfectly aligned in upper and lower pairs, and the container could be designed so that the tubes 74 are positioned outside the side walls 24, although the configuration disclosed is clearly preferred. Accordingly, it is not desired to limit the invention to the exact construction and operation shown and described, and all suitable modifications and equivalents may be resorted to that fall within the scope of the invention.

What is claimed as new is as follows:

1. A multipurpose marine life container which comprises enclosing walls defining a closed chamber and having a plurality of openings to allow free flow of water therethrough, one of said walls having an entrance opening formed therethrough, a shiftable gate member guidingly mounted interiorly of said one wall and including at least one entry funnel inwardly opening therethrough and a closing area for substantially closing said entrance opening, said shiftable gate member being mounted for movement relative to said one wall between positions with said closing area and said one funnel selectively registered with said entrance opening.

2. The container of claim 1 wherein said shiftable gate member includes a plurality of different size entry funnels opening inwardly therethrough as well as said closing area, said shiftable gate member being shiftable between positions with said closing area and said funnels selectively registered with said entrance opening.

3. The container of claim 2 wherein said shiftable gate member includes three different size entry funnels as well as said closing area.

4. The container of claim 1 wherein said shiftable gate member is a disk rotatably guidingly mounted interiorly on said one wall and said entry funnel is molded integrally with said disk.

5. The container of claim 4 wherein said shiftable gate disk and said one wall have mating frusto-conical shapes so that said disks fits within said one wall.

6. The container of claim 1 wherein said container includes a second wall remote from said one wall, said second wall including a second entrance opening formed therethrough, a second shiftable gate member guidingly mounted interiorly of said second wall and including at least one entry funnel opening inwardly therethrough and a closing area for substantially closing said second entrance opening, said second gate member being mounted for shifting relative to said second wall between positions with said closing area and said funnel of said second gate member selectively registered with said second entrance opening.

7. The container of claim 6 wherein said second shiftable gate member defines a plurality of different size entry funnels opening inwardly therethrough as well as said closing area, said second shiftable gate member being shiftable between positions with said closing area and said funnels selectively registered with said second entrance opening.

8. The container of claim 1 wherein said closed chamber is defined by a pair of one half clam shell-type housing halves removable joined together along a parting line generally bisecting said one wall, said housing halves defining semicircular coextensive openings facing toward each other along said parting line to form a substantially circular opening in said wall, said housing halves defining inner, generally semicircular and coextensive radially opening grooves opening towards said parting line, said gate member comprising a generally circular disk having a generally annular outer periphery rotatably received in said semicircular grooves, said entry funnel and said closed area as well as said entrance opening being generally equally radially spaced outward from the center of said circular wall opening.

9. The container of claim 8 wherein said circular disk includes a center projection rotatably received in said circular wall opening and defining a finger engageable member to which manual torque may be applied from exteriorly of said container to adjustably angularly rotate said gate member.

10. The container of claim 9 wherein said center projection includes indicia on an outer surface to identify the position of said funnel and said closed area with respect to said entrance opening.

11. The container of claim 1 and further including a swingable door pivotally connected to one of said walls for opening said closed chamber to remove marine life having entered said container through said registered funnel and entrance opening.

12. The container of claim 1 wherein said closed chamber is defined by a pair of one half clam shell-type housing halves removably joined together along a parting line, each of said housing halves including partial opposite end walls and partial top and bottom walls joined by a generally upstanding side wall extending therebetween, each of said partial end walls having upper and lower openings formed therethrough, elongated upper and lower reinforcing members extending and removably secured through each pair of corresponding upper and lower openings of said partial end walls of each housing half affording torsional rigidity to said container, said side walls each including opposite end upper and lower inwardly offset sleeve portions through which said reinforcing members are snugly slidably received, said sleeve portions being spaced inward of said partial end walls, said housing halves including abutting edge portions extending along said parting line, the abutting edge portions of each housing half including outwardly opening recesses and outwardly projecting pins, said pins of each housing half being snugly received in the outwardly opening recesses of the other housing half, said housing halves being formed from molded plastic and being substantially identically formed, said housing halves side walls each including upper and lower opposite end inwardly facing abutments adjacent said sleeve portions for engaging said reinforcing members, said elongated reinforcing members being hollow for filling to adjust a buoyancy of said container in a body of water, each of said side walls including a lower side opening formed therein, a pair of doors for said side openings having upper free and lower hinge margins, said lower hinge margins being hingedly mounted from the corresponding lower reinforcing members for swinging of said doors between downwardly and outwardly inclined open positions and generally upstanding closed positions closing said side openings, and latch means operative to releasably latch each of said doors in the closed position, holes in the free margins of said doors for connection to lines of a lifting bridle for lifting said container by a retrieval line, said bridle lines being of sufficient length to extend from said opposite ends of said free margins, when said doors are open, up to and above the top of said container, said doors being cantilever mounted from said container for free gravity swinging from said closed position to said open position when said bridle lines are slack, said doors each including inwardly offset mounting sleeves supported therefrom and journaled from one of the corresponding lower reinforcing members, a biodegradable latch for latching a door in a closed position, which latch biodegrades over a limited period of time to allow said door to automatically open to an open position and said entrapped marine life to exit said chamber when said trap has not been retrieved within said limited period of time, said partial top wall of each housing half including an inwardly facing opening formed therethrough which define a top wall hatch, a bait basket supported in said top wall hatch and depending into the closed chamber, said bait basket having a removable top closure and handle for closing said bait basket and also closing said top wall hatch.

13. A multipurpose marine life container defined by a closed chamber bound by enclosing walls comprising a pair of one half clam shell-type housing halves removably joined together along a parting line, each of said housing halves including partial opposite end walls and partial top and bottom walls joined by a generally upstanding side wall extending therebetween, each of said partial end walls having upper and lower openings formed therethrough, elongated upper and lower reinforcing members extending and removably secured through each pair of corresponding upper and lower openings of said partial end walls of each housing half affording torsional rigidity to said container, at least one pair of corresponding partial end walls defining coextensive half openings formed therein and opening into each other along said parting line, said half openings together defining an entrance opening for said container, said housing halves defining inner, generally semicircular and coextensive radially inwardly opening grooves opening towards said parting line, a gate member comprising a generally circular disk having a generally annular periphery rotatably received in said semicircular grooves, said entrance opening being spaced radially outwardly of the center axis of said semicircular grooves, said gate member including at least one funnel opening inwardly therethrough and a closing area for substantially closing said entrance opening, said funnel and closing area of said gate member moving into and out of substantial registry with said entrance opening upon angular rotation of said disk relative to said housing halves.

14. The container of claim 13 wherein said gate member defines a plurality of different size funnels opening inwardly therethrough as well as said closing area, said gate member being rotatable between selected positions for substantially registering one of said funnels or said closing area with said entrance opening.

15. The container of claim 14 wherein said gate member includes three of said different size funnels as well as said closing area.

16. The container of claim 15 wherein said circular disk includes a center projection rotatably received in a circular opening formed by said partial opposite end walls, said projection defining a finger engageable member to which manual torque may be applied from exteriorly of said container to adjustably angularly rotate said gate member.

* * * * *